Feb. 27, 1945.  W. A. BARROWS  2,370,516
TRAP
Filed Oct. 27, 1941
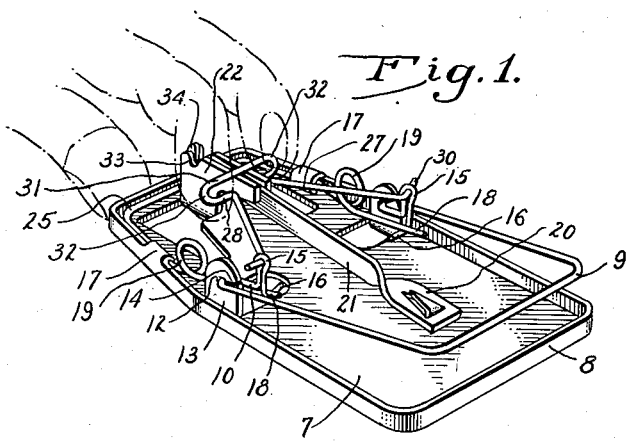
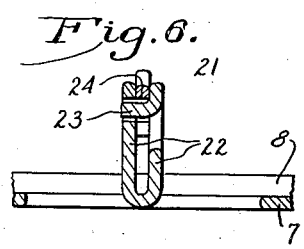
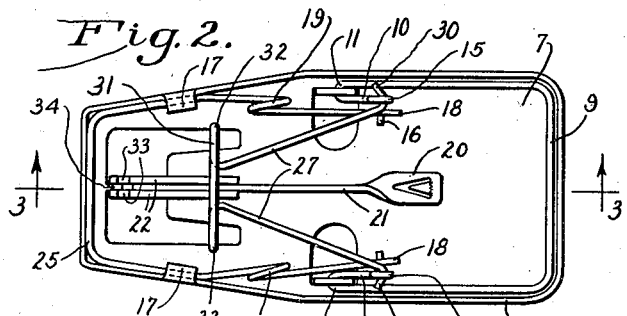
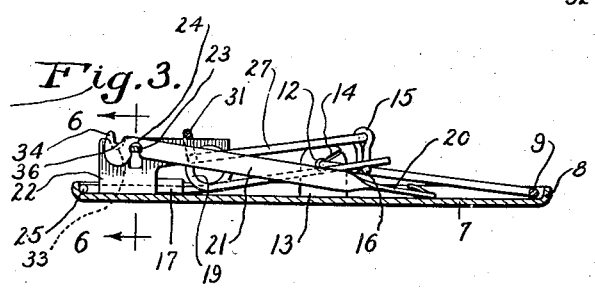
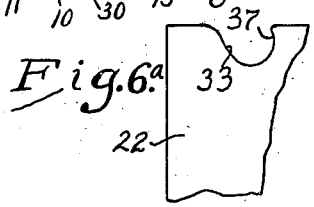
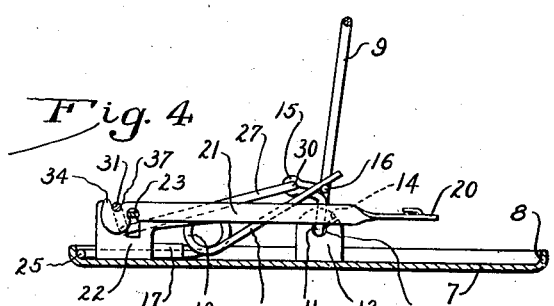
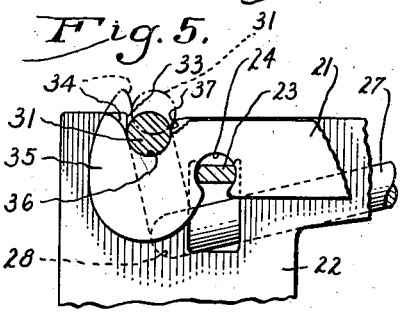
INVENTOR
Walter A. Barrows
By Parker, Carlson, Pitzner & Hubbard
ATTORNEYS Patented Feb. 27, 1945

2,370,516

UNITED STATES PATENT OFFICE 2,370,516

TRAP

Walter A. Barrows, Belvidere, Ill.; Clara M. Barrows, executrix of said Walter A. Barrows, deceased, assignor to Taylor E. Decker, Rockford, Ill.

Application October 27, 1941, Serial No. 416,675

13 Claims. (Cl. 43—83.5)

This invention relates to animal traps of the type which may be set without the necessity of manually raising the bait holder during setting of the trap or touching the jaw by which an animal is held in order to release the latter.

One object is to provide a trap of the above general character in which setting of the trap and release of a caught animal is effected by a reciprocatory or sliding movement of an actuating element.

A more detailed object is to provide such a trap in which setting of the trap is effected by pulling on the actuating element.

The invention also resides in the novel features of construction which provide for compactness in packing and which simplify the construction and assembly of the trap so that the latter may be manufactured at a low cost.

Other objects and advantages of the invention will become apparent from the following detailed description taken in connection with the accompanying drawing, in which Figure 1 is a perspective view of the improved trap illustrating the manner of setting the same.

Fig. 2 is a plan view of the trap with the parts released.

Figs. 3 and 4 are cross-sectional views taken along the line 3—3 of Fig. 2 showing respectively released and set positions of the parts.

Fig. 5 is an enlarged fragmentary view of a portion of Fig. 4.

Fig. 6 is a section taken along the line 6—6 of Fig. 3.

Fig 6ª is an enlarged fragmentary view of a portion of Fig. 5.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

The trap shown for purposes of illustration includes a sheet metal base 7 formed with a peripheral flange 8 to provide rigidity and having a substantially square end coacting with a spring actuated jaw 9 to hold a caught animal. The jaw is a squared U-shaped piece of wire bent reversely as indicated at 10 to provide bends 11 which extend through holes 12 in upstanding lugs 13 struck up from the base 7. The lugs are slotted as indicated at 14 so that one side may be bent laterally to permit insertion of the bends 11 in the holes 12, thereby facilitating assembly of the jaw on the base. The end portions 10 of the wire are bent upwardly and then downwardly to form eyes 15 and their ends 16 are bent toward each other at right angles so as to be disposed adjacent the base when the jaw is released.

Extending around the other end of the base within the flange 8 and held against the base by inturned lugs 17 integral with the flange is a U-shaped spring 25 having generally parallel end portions 18 projecting along the base and bearing downwardly at their ends on the end portions 16 of the jaw 9. Loops 19 may be formed in the spring arms 18 to increase the force exerted on the jaw to swing it downwardly against the base and thereby hold a caught animal.

The bait is supported on a holder 20 disposed centrally of the base between the closed end of the jaw and the pivotal axis thereof. In the present instance, this holder is on one end of an elongated arm of a bait lever 21 disposed between and guided in its swinging movements by plates 22 which preferably are struck out from the metal of the base 7 near the end of the latter remote from the jaw. A lug 23 struck laterally from one of the plates 22, as shown in Fig. 6, projects through a circular notch 24 in the bait lever and provides a horizontal pivot for the latter. The lever is thus pivotally supported above the base and is guided during its vertical swinging movement by the plates 22 which project forwardly a substantial distance from the pivot 23. The weight of the bait holder tends to swing the elongated arm downwardly against the base when the arm is released.

In accordance with the present invention, the jaw is raised and the trap set by actuation of an element slidable along the plates 22 by a pull directed away from the jaw pivot. Herein, this actuating element comprises a generally V-shaped wire 27 with its free ends bent laterally and outwardly as indicated at 30 and projecting through the eyes 15 in the jaw. At the closed end, the wire is bent laterally and outwardly as indicated at 28 and thence upwardly and over the tops of the plates 22 to form a horizontal crossbar 31 which slides along the upper surfaces of the plates. The two loops 32 thus formed between the crossbar and the free ends of the wire may be engaged by the fore and middle fingers of one hand while the thumb abuts against the rear end of the base as illustrated in Fig. 1. In this way, the wire 27 may be slid rearwardly conveniently and the reciprocatory motion thus imparted to the wire swings the eyes 15 rearwardly, raising the jaw from the released position shown in Fig. 3 to the set position shown in Fig. 4.

When the actuating element 27 is pulled rearwardly to set the trap, the crossbar 31 is pressed into notches 33 in the upper edges of the plates 22. In this motion, the crossbar engages a surface 34 on an upstanding lug 35 at the end of the bait lever and also the bottom 36 of an upwardly opening notch in the bait lever. Thus, as the bar drops into the notches 33, it depresses the short end of the bait lever about the pivot 23 and raises the holder 20 to the position shown in Fig. 4, the motion being limited by the bottoms of the notches 33.

With the crossbar 31 seated against the bottoms of the notches 33, the center of the bar, which is of circular cross-section, will be disposed below the top of the slightly undercut latching surfaces 37 (Figs. 5 and 6a) defining the forward edges of the notches 33. Thus, as the manually applied pull on the crossbar is released and the bar moves forwardly under the action of the spring arms 18, the bar moves against the undercut surfaces which overlie the bar sufficiently to hold it downwardly in the notches 33 as shown in Fig. 5. The bait arm of the lever 21 is at this time held in a raised position and the overbalanced weight of its forward end with the bait supported thereon is insufficient to overcome the friction between the crossbar and the surfaces 37. However, when additional downward pressure is applied to the bait, the lever 21, operating at substantial mechanical advantage, raises the crossbar and frees it from the stationary latching surfaces 37. A caught animal is released from the trap simply by grasping the loops 32 as described before and pulling them rearwardly the required amount.

It will be apparent from the foregoing description that the setting of the trap and the release of a caught animal are simple operations involving merely the exertion of a rearward pull on the loops 32 to slide the crossbar along the plates 22. The parts contacted by the thumb and fingers as an incident to this are remote from the caught animal and the lowering of the bar 31 to raise the bait arm and set the trap takes place as a natural incident to the continued application of the pulling force. The number of parts is reduced to a minimum and these parts are of wire or simple stampings which provide for quick and easy assembly.

I claim as my invention:

1. An animal trap comprising a base, a U-shaped jaw pivoted on said base and having upstanding arms intermediate the closed end of the jaw and the jaw pivot, means normally urging said jaw toward released position, a slide having upstanding finger pieces at one end and connected at its other end to said jaw arms whereby the jaw is raised and lowered as an incident to reciprocation of said slide back and forth, a plate upstanding from said base near the end thereof remote from said jaw and providing a rest for guiding said slide, said plate having an upwardly opening notch into which said slide may drop during setting of said jaw, a defining edge of said notch being undercut to latch said slide in the notch, a lever pivoted intermediate its ends on said plate and engaged at one end by said slide in moving into said notch, a bait holder on the other end of said lever raised from said base in the lowering of said first mentioned slide end, and means on said lever engageable with said slide to release the latter from said notch when the bait holder is depressed.

2. An animal trap comprising a base, a U-shaped jaw pivoted on said base, means normally urging said jaw toward released position, a slide having upstanding finger pieces at one end and connected at its other end to said jaw intermediate the ends and adjacent the pivot thereof whereby to raise and lower the jaw as an incident to reciprocation of said slide back and forth, a plate upstanding from said base near the end thereof remote from said jaw and providing a rest for guiding said slide and a stationary latch for holding the slide with said jaw set, a lever pivoted intermediate its ends on said plate and engaged at one end by said slide in movement of the latter to raise said jaw, a bait holder on the other end of said lever raised from said base by engagement of the lever by said slide, and means on said lever engageable with said slide to release the latter from said latch.

3. An animal trap comprising a base, a spring actuated jaw pivoted on said base, a slide having upstanding finger pieces at one end and connected at its other end to said jaw intermediate the ends of the latter whereby the jaw is raised and lowered as an incident to reciprocation of said slide back and forth, latch means engageable with said slide to hold said jaw raised, and a bait holder pivotally supported by said base and movable to release said slide from said latch means.

4. An animal trap comprising a base, a U-shaped wire pivoted on said base and having lateral arms disposed between the closed end and the pivots, said wire being bent between said pivots and said arms to form upstanding eyes, a spring bearing downwardly against said arms, a forked wire having loops providing finger pieces at its closed end, the ends of said second wire being hooked through said eyes, means guiding said second wire for reciprocation above said base, latch means fixed to said base and engaging said second wire to hold the jaw in set position, and a bait lever swingable on a pivot fixed relative to said base and engageable with the closed end of said second wire to release said jaw.

5. An animal trap comprising a base, a spring actuated jaw pivoted on said base and having arms intermediate its ends and upstanding from the jaw when the latter is in released position, an element mounted to slide endwise above said base and connected to said arms to swing the jaw during sliding of the element, and latch means rendered operative automatically at the end of said sliding movement to hold said jaw in set position.

6. An animal trap comprising a base, a jaw pivoted on said base and urged toward the latter, arms rigid with said jaw adjacent the pivot thereof and upstanding from the jaw when the latter is closed against said base, a bail pivotally connected at one end to said arms, means on said base supporting the other end of said bail to slide along the base when the bail is pulled manually away from the jaw pivot whereby to raise the jaw above said base, a bait arm movably supported by said base, and latch means engageable with said bail after a predetermined retraction thereof to hold the jaw in raised position, said bail being releasable by movement of said bait arm.

7. An animal trap comprising a base, a U-shaped jaw pivoted on said base and normally urged toward released position, an element adapted for movement parallel to and along said base away from the jaw pivot and operatively connected to the jaw at points disposed adjacent the jaw pivot and spaced from the free end of the jaw, said element operating during movement away from said pivot to raise the jaw away from the base, means on said base slidably engaging said element so as to support the latter during its movement along the base, latch means stationary relative to said base and engageable with said element to hold the same in set position, a bait lever pivotally supported by said base having a bait arm cammed away from the latter in the final movement of said jaw, and means on said lever engageable with said element to release the latter from said latch means in the reverse movement of said bait lever.

8. An animal trap comprising a base, two wires, one pivoted to and the other slidable above said base, said wires being connected to each other intermediate the ends of the pivoted wire and adjacent the pivot of the latter for swinging of the latter during reciprocation of the slidable wire substantially parallel to said base, spring means urging said pivoted wire toward said base, latch means rendered active as an incident to sliding of said other wire and engaging the latter to latch the sliding wire and hold the pivoted wire in spaced relation to said base, and means by which the sliding wire may be released from said latch means.

9. An animal trap comprising a base, two wires, one pivoted and the other slidable above said base along a path extending substantially parallel to the latter, said wires being connected together intermediate the ends of the pivoted wire and adjacent the latter for swinging of the latter during reciprocation of the slidable wire, spring means urging said pivoted wire toward said base, a bait lever swingable about a pivot fixed relative to said base and raised therefrom as an incident to sliding of said other wire to swing the pivoted wire away from said base, and latch means engageable with said slidable wire to hold the pivoted wire in set position with said bait lever raised from the base.

10. An animal trap comprising a base, a jaw and a bait lever swingable on pivots supported by said base, an actuating element, and a member having a surface above and substantially parallel to the base, said element contacting said surface during substantially the entire setting movement thereof and disposed adjacent said base and movable along the latter to set said jaw and bait lever, said element being engageable by a finger of one hand so as to be pulled in a direction to set the trap while the thumb of such hand is engaging an edge of said base in all positions of said element during setting of the jaw.

11. An animal trap having a base, a jaw, and a bait lever swingable about pivots supported by said base, a member extending upwardly from the base and having a surface thereon substantially parallel to the base, and an element supported by said surface to slide toward one end thereof and connected to said jaw to swing the latter away from the base, said element being engageable by one digit of the hand while another digit bears against the end of said base whereby to facilitate application of a pull to said element to swing said jaw away from the base.

12. An animal trap comprising a base, a jaw pivoted on said base and urged toward the latter, a bail pivotally connected to said jaw intermediate the ends of the latter and bodily movable longitudinally of said base and substantially parallel to the latter to raise the jaw therefrom, and means providing a surface engageable with the closed end portion of said bail during substantially the entire setting of said jaw and having a notch therein to receive such end and latch the jaw in set position.

13. An animal trap comprising a base, a jaw pivoted on said base and urged toward the latter, a bail pivotally connected to said jaw at points spaced from the free end of the jaw and adjacent the pivot thereof and bodily movable along said base to raise the jaw therefrom, and means providing a surface engageable with the closed end portion of said bail during substantially the entire setting of said jaw and having a notch therein to receive such end, one defining wall of said notch being undercut to engage said bail and hold the jaw in set position.

WALTER A. BARROWS.